US010202029B2

(12) United States Patent
Sumikawa et al.

(10) Patent No.: US 10,202,029 B2
(45) Date of Patent: Feb. 12, 2019

(54) HIGH VOLTAGE UNIT

(71) Applicant: TOYOTA JIDOSHA KABUSHIKI KAISHA, Toyota-shi, Aichi-ken (JP)

(72) Inventors: Hiroki Sumikawa, Toyota (JP); Hiroyuki Sekine, Nisshin (JP)

(73) Assignee: Toyota Jidosha Kabushiki Kaisha, Toyota-shi, Aichi-ken, (JP)

( * ) Notice: Subject to any disclaimer, the term of this patent is extended or adjusted under 35 U.S.C. 154(b) by 0 days.

(21) Appl. No.: 15/933,841

(22) Filed: Mar. 23, 2018

(65) Prior Publication Data
US 2018/0304734 A1    Oct. 25, 2018

(30) Foreign Application Priority Data
Apr. 21, 2017    (JP) .................. 2017-084076

(51) Int. Cl.
| | | |
|---|---|---|
| *B60K 1/00* | (2006.01) | |
| *B60K 6/20* | (2007.10) | |
| *B60K 11/00* | (2006.01) | |
| *B60R 16/04* | (2006.01) | |
| *G06F 1/16* | (2006.01) | |
| *B60K 1/04* | (2006.01) | |
| *B60K 8/00* | (2006.01) | |
| *H01M 10/625* | (2014.01) | |
| *B60L 11/18* | (2006.01) | |

(52) U.S. Cl.
CPC .............. *B60K 1/04* (2013.01); *B60K 8/00* (2013.01); *B60L 11/1892* (2013.01); *H01M 10/625* (2015.04); *B60K 2001/005* (2013.01)

(58) Field of Classification Search
CPC ......... B60K 1/04; B60K 8/00; B60L 11/1892; H01M 10/625

USPC ..... 361/688, 679.01, 679.02; 180/68.5, 65.1, 180/65.21, 68.1, 68.2
See application file for complete search history.

(56) References Cited

U.S. PATENT DOCUMENTS 8,757,304 B2* 6/2014 Amano ................... B60K 1/00
                                                                            180/65.1
9,260,034 B2* 2/2016 Naito .................... B60L 3/0007
(Continued)

FOREIGN PATENT DOCUMENTS

JP          2014076716 A       5/2014

OTHER PUBLICATIONS

Related U.S. Appl. No. 15/923,061, filed Mar. 16, 2018.

*Primary Examiner* — Anthony M Haughton
(74) *Attorney, Agent, or Firm* — Dickinson Wright, PLLC

(57) ABSTRACT

A high voltage unit installed in a vehicle includes a high voltage component and a casing that accommodates the high voltage component. The casing includes a side wall provided with a pressure receiving portion that receives impact in a horizontal direction and a planer portion on which the high voltage component is arranged, the planer portion being adjacent to an inner side of the side wall. The high voltage component is arranged on the planer portion with a gap from the side wall provided with the pressure receiving portion. An area corresponding to the gap of the planer portion includes a portion, between the pressure receiving portion and the high voltage component, provided with a brittle portion, and includes a portion, other than the brittle portion, provided with a high strength portion having higher strength than the brittle portion.

7 Claims, 14 Drawing Sheets

(56) References Cited

U.S. PATENT DOCUMENTS

2007/0007060 A1* 1/2007 Ono .................... B60K 1/04
                                                180/65.31
2017/0334310 A1* 11/2017 Yokoyama .......... H01M 10/613

* cited by examiner

HIGH VOLTAGE UNIT

CROSS REFERENCE TO RELATED APPLICATIONS

The present application claims the priority based on Japanese Patent Application No. 2017-084076 filed on Apr. 21, 2017, the disclosure of which is hereby incorporated by reference in its entirety.

BACKGROUND

Field

The present disclosure relates to a high voltage unit.

Related Art

JP 2014-076716A discloses a vehicle including a fuel cell. The fuel cell disclosed in JP 2014-076716A has an upper surface provided with a high voltage unit. The high voltage unit includes various high voltage components such as a battery voltage control unit, a fuel cell power generation control unit, and a relay box.

Such a high voltage unit is designed to have high strength for the sake of electrically safety. Unfortunately, even a case designed to have high strength might fail to reduce impact on the high voltage components in the casing because the impact is applied to the casing in various ways. Thus, a technique that can reduce the impact applied to the high voltage components in the high voltage unit installed in a vehicle has been called for.

SUMMARY

According to one aspect of the disclosure, there is provided a high voltage unit installed in a vehicle. This high voltage unit includes a high voltage component and a casing that accommodates the high voltage component. The casing includes a side wall provided with a pressure receiving portion that receives impact in a horizontal direction and a planer portion on which the high voltage component is arranged, the planer portion being adjacent to an inner side of the side wall. The high voltage component is arranged on the planer portion with a gap from the side wall provided with the pressure receiving portion. An area corresponding to the gap of the planer portion includes a portion, between the pressure receiving portion and the high voltage component, provided with a brittle portion, and includes a portion, other than the brittle portion, provided with a high strength portion having higher strength than the brittle portion.

DETAILED DESCRIPTION

A. First Embodiment

Figure 1:
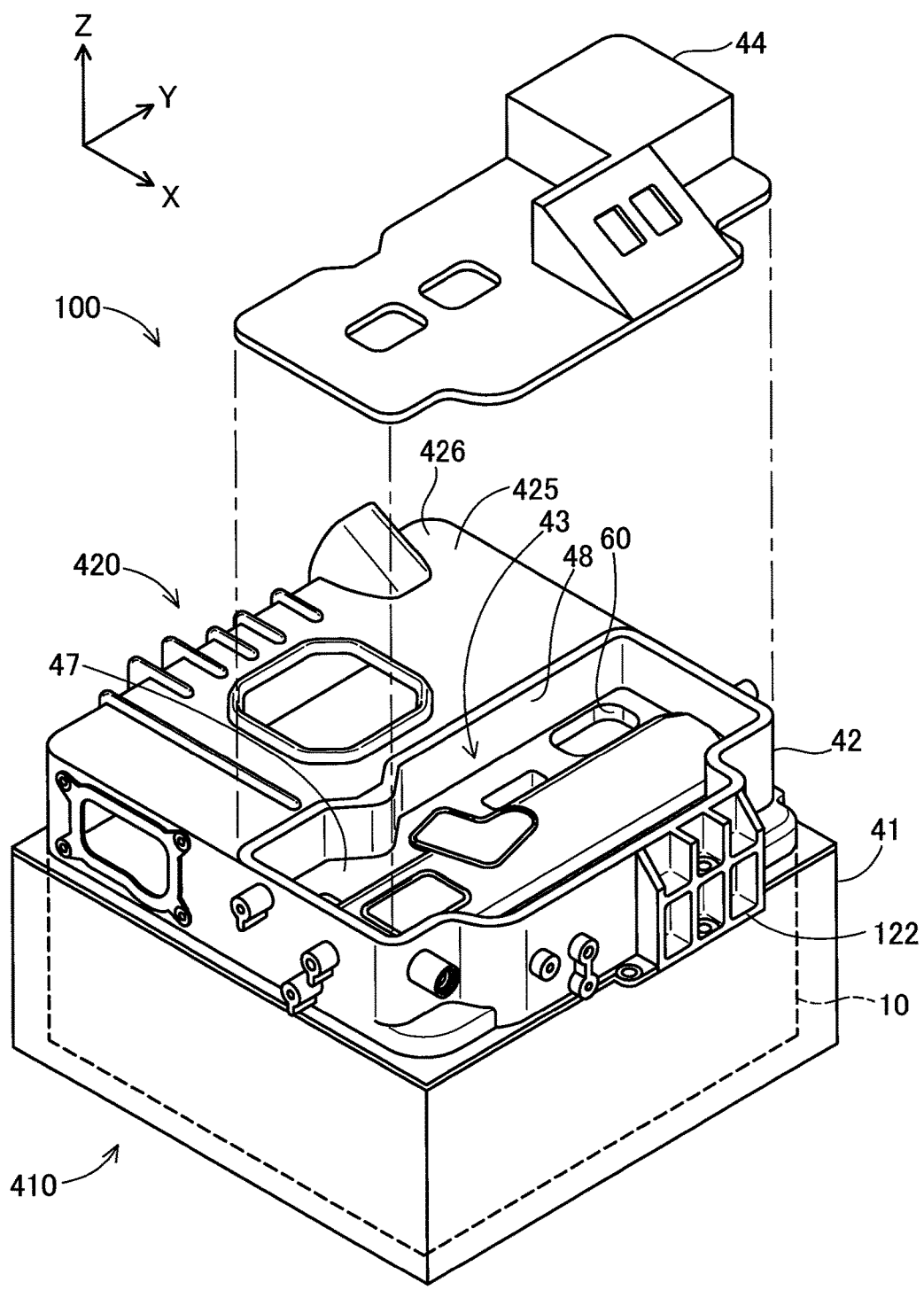
FIG. 1 is a perspective view illustrating a schematic configuration of a fuel cell unit including a high voltage unit.

FIG. 1 is a perspective view illustrating a schematic configuration of a fuel cell unit 100 including a high voltage unit 420 according to one embodiment of the present disclosure. The fuel cell unit 100 is installed in a fuel cell vehicle. In FIG. 1, three directions orthogonal to each other (an X direction, a Y direction, and a Z direction) are illustrated. The Z direction is a vertically upward direction. The X direction, orthogonal to the Z direction, is a right side direction as viewed from a driver seat in a vehicle including the fuel cell unit 100. The Y direction, orthogonal to the Z direction and the X direction, is a forward side direction as viewed from the driver seat in the vehicle including the fuel cell unit 100. Directions illustrated in FIG. 2 and after correspond to these directions illustrated in FIG. 1.

The fuel cell unit 100 includes a stack unit 410 and a high voltage unit 420. The stack unit 410 includes a fuel cell stack casing 41 that is a substantially rectangular parallelepiped casing having an upper portion open. The fuel cell stack 10 is arranged and fixed in the fuel cell stack casing 41. The fuel cell stack 10 includes a plurality of fuel cells stacked. The fuel cell according to the present embodiment is a solid polymer fuel cell, and generates power upon receiving hydrogen and oxygen supplied. The fuel cell is not limited to the solid polymer fuel cell, and various types of fuel cells using hydrogen to generate power may be used.

The high voltage unit 420 includes a high voltage unit casing 42 for accommodating various high voltage components described later and a high voltage casing for accommodating the high voltage components. The high voltage unit casing 42 is a substantially rectangular parallelepiped casing having a lower portion open. The high voltage unit casing 42 has an upper wall 425 partially provided with a recess 43. A cover 44 is attached to cover the recess 43. A portion of the upper wall 425 of the high voltage unit casing 42, not provided with the recess 43, is hereinafter referred to as a top wall 426.

The high voltage unit casing 42 is disposed on the upper portion of the fuel cell stack casing 41 and is fixed to the fuel cell stack casing 41 with bolts. The fuel cell stack casing 41 has the upper portion open and the high voltage unit casing 42 has the lower portion open. Thus, in the fuel cell unit 100, the stack unit 410 and the high voltage unit 420 have internal spaces in communication with each other. For example, the fuel cell stack casing 41 and the high voltage unit casing 42 may be made of aluminum or an aluminum alloy. The fuel cell stack casing 41 and the high voltage unit casing 42 may be made of other types of metal such as stainless steel.

The high voltage unit 420 is for accommodating a plurality of electrical devices including a high voltage component. The high voltage component may be any electrical device that is required to be prevented from being exposed from the high voltage unit casing 42, when the high voltage unit casing 42 is damaged due to vehicle collision or the like, for the sake of safety for example. Such a requirement may be based on various regulations, laws, or the like for example. For example, the high voltage component may be a device that operates at a DC voltage of 60 V or higher or at an AC voltage of 30 V or higher. The high voltage component may operate at a DC voltage of 100 V or higher. The high voltage component may operate at a DC voltage of 300 V or lower.

Figure 2:
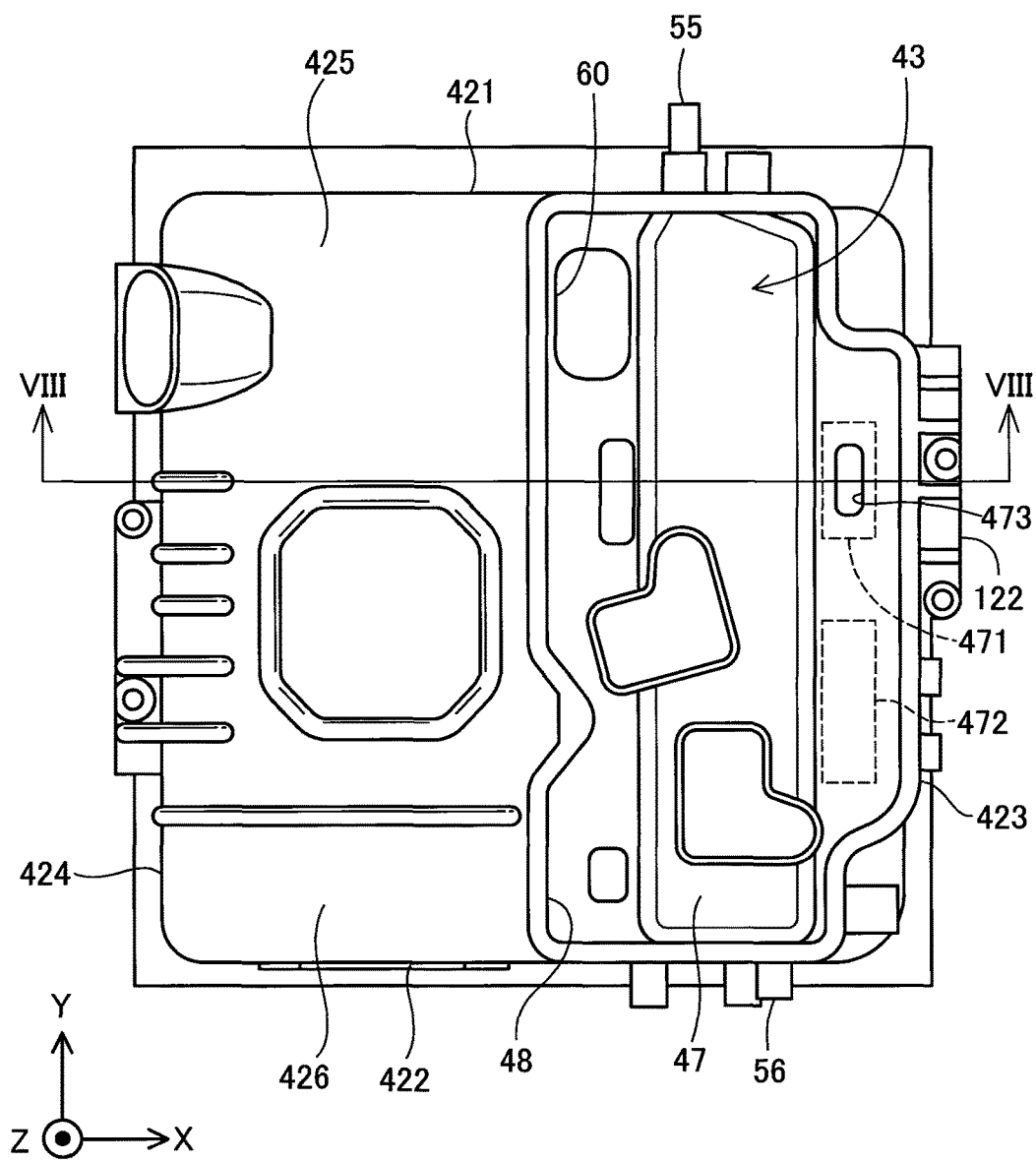
FIG. 2 is a plan view of a high voltage unit casing.
Figure 3:
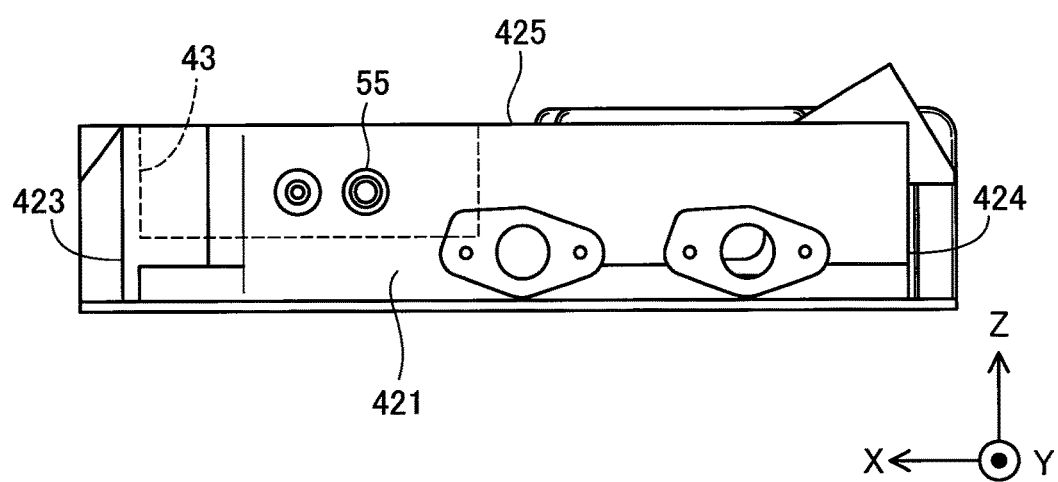
FIG. 3 is a front view of the high voltage unit casing.
Figure 4:
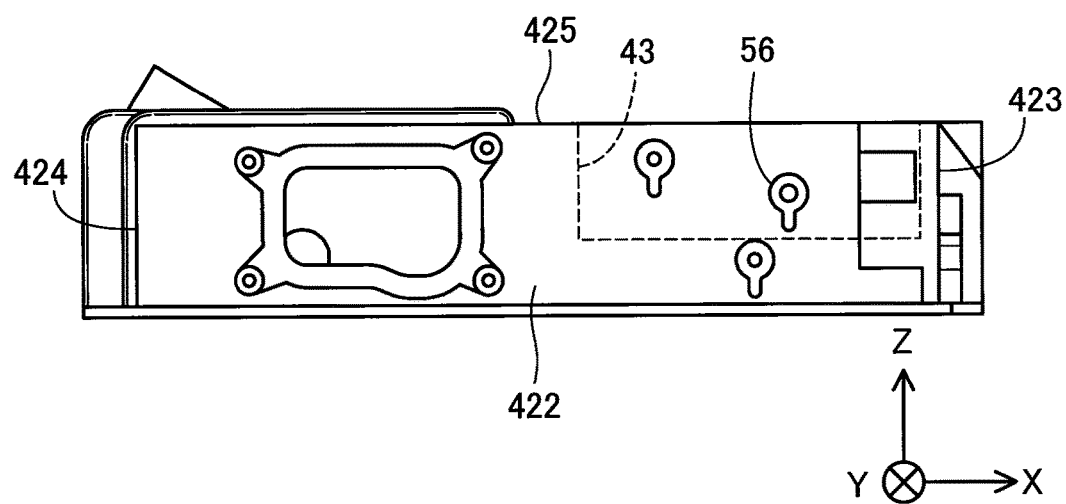
FIG. 4 is a back view of the high voltage unit casing.
Figure 5:
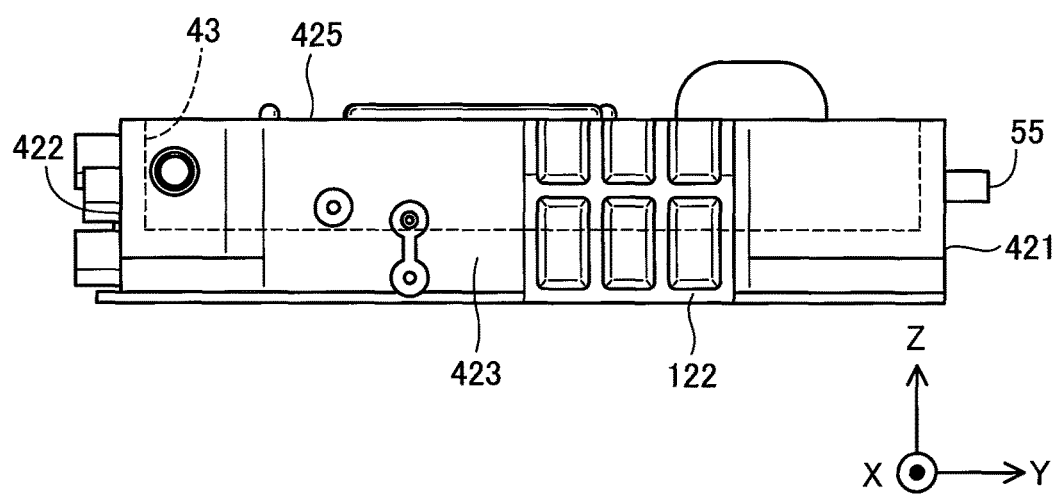
FIG. 5 is a right side view of the high voltage unit casing.
Figure 6:
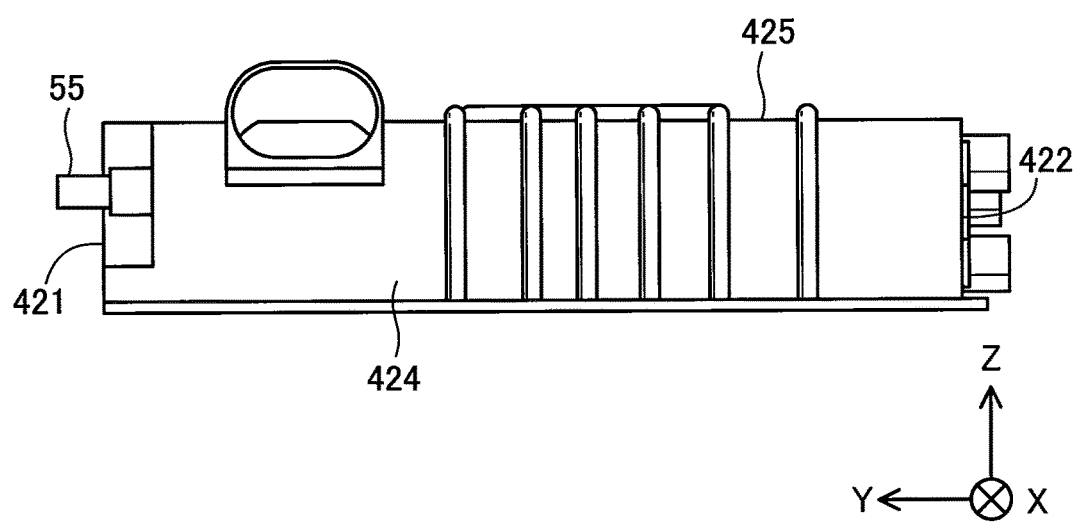
FIG. 6 is a left side view of the high voltage unit casing.
Figure 7:
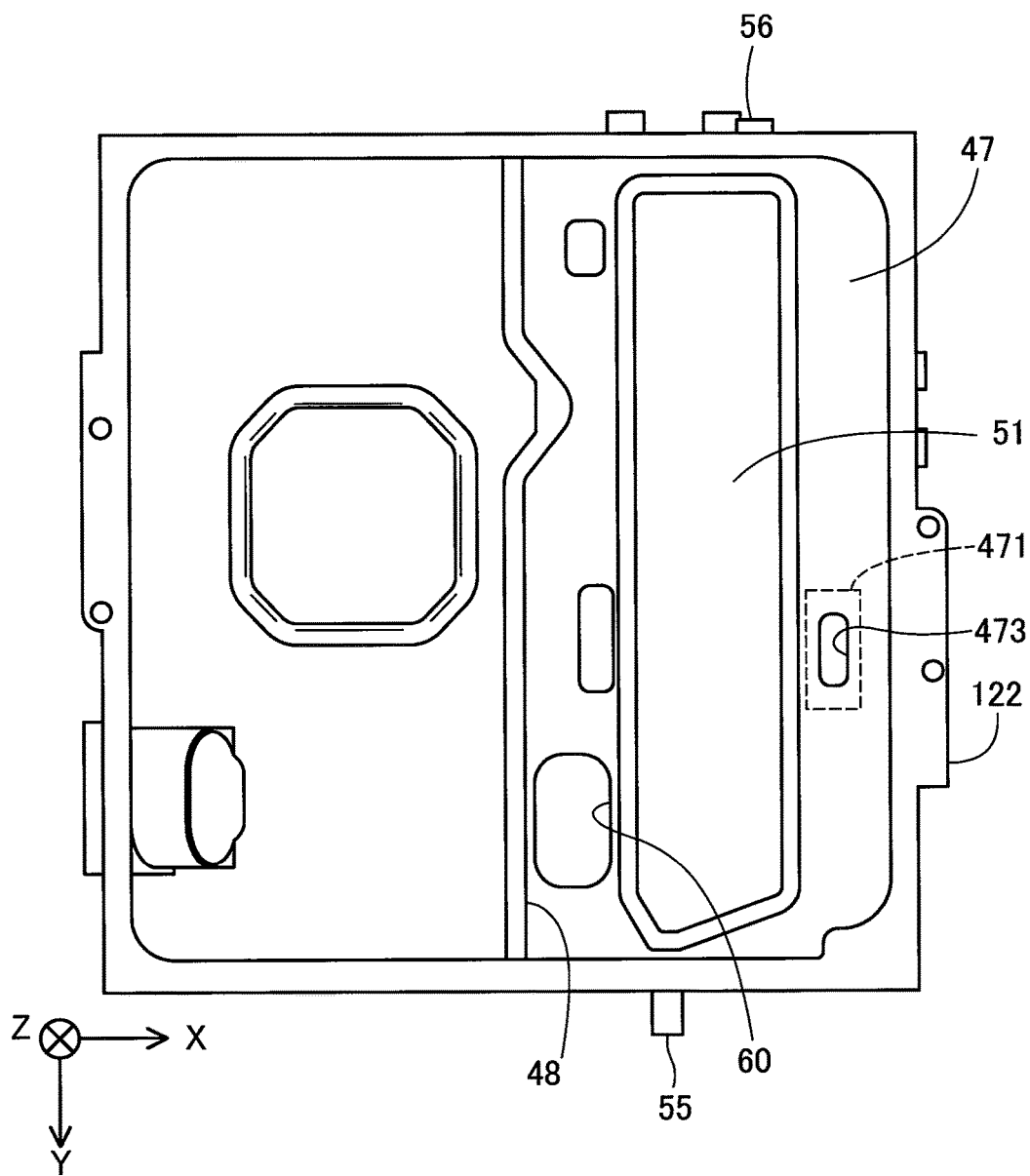
FIG. 7 is a bottom view of the high voltage unit casing.
Figure 8:
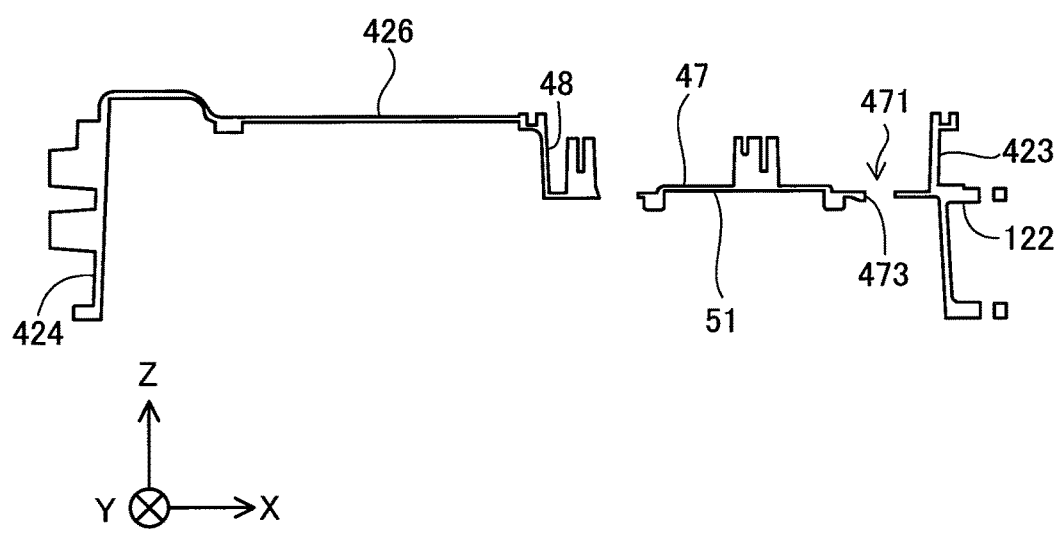
FIG. 8 is a cross-sectional view taken along line VIII-VIII in FIG. 2.

FIG. 2 is a plan view of the high voltage unit casing 42. FIG. 3 is a front view of the high voltage unit casing 42. FIG. 4 is a back view of the high voltage unit casing 42. FIG. 5 is a right side view of the high voltage unit casing 42. FIG. 6 is a left side view of the high voltage unit casing 42. FIG. 7 is a bottom view of the high voltage unit casing 42. FIG. 8 is a cross-sectional view taken along line VIII-VIII in FIG. 2. In the attached drawings, hatching of cross-sectional portions in the cross-sectional views is omitted.

As illustrated in FIGS. 2 to 7, the high voltage unit casing 42 includes a first side wall 421, a second side wall 422, a third side wall 423, a fourth side wall 424, and the upper wall 425. In the description below, the first side wall 421 is also referred to as a front wall 421, the second side wall 422 is also referred to as a back wall 422, and the third side wall 423 is also referred to as a right side wall 423, and the fourth side wall 424 is also referred to as a left side wall 424. The first side wall 421, the second side wall 422, the third side wall 423, the fourth side wall 424, and the top wall 426 have openings. Through these openings, various harnesses are drawn to be connected to a device outside the fuel cell unit 100. Gaps between the openings and the harnesses are closed with lids and sealing members.

The first side wall 421, the second side wall 422, the third side wall 423, and the fourth side wall 424 have generally flat outer surfaces. The generally flat surface includes an entirely and completely flat surface and a surface partially including recesses and protrusions or a through hole. Thus, the generally flat surface may be a surface partially including recesses/protrusions or a through hole. This surface can still be regarded as a surface or a wall forming the outer shape. Each of the first side wall 421, the second side wall 422, the third side wall 423, and the fourth side wall 424 has a substantially rectangular outer shape as viewed in a normal direction of the side wall.

As illustrated in FIGS. 2 and 5, the high voltage unit casing 42 includes a pressure receiving portion 122 that receives impact input in the horizontal direction. In the present embodiment, the pressure receiving portion 122 includes a rib, in a lattice form, protruding in the X direction. The pressure receiving portion 122 is provided to the right side wall 423 of the high voltage unit 420. The configuration of the pressure receiving portion 122 is not limited to the rib in the lattice form, and may be established with a portion corresponding to the pressure receiving portion 122 entirely being thicker than other portions. Alternatively, the pressure receiving portion 122 may be formed with another member with high strength provided to the portion corresponding to the pressure receiving portion 122.

As illustrated in FIG. 2 and FIG. 8, the high voltage unit casing 42 includes a planer portion 47 on which high voltage components are arranged. The planer portion 47 is arranged on the high voltage unit casing 42 along the horizontal direction. The planer portion 47 is adjacent to the inner side of the right side wall 423 provided with the pressure receiving portion 122. In the present embodiment, the planer portion 47 is positioned between upper and lower ends of the right side wall 423 as illustrated in FIG. 8. The planer portion 47 is provided with a brittle portion 471 and a high strength portion 472 as illustrated in FIG. 2. Arrangement and details of the high voltage component, the brittle portion 471, and the high strength portion 472 are described later in detail. The planer portion 47 has substantially planer upper and lower surfaces.

As described above, the recess 43 is formed on the upper wall 425 of the high voltage unit casing 42. The planer portion 47 serves as the bottom wall of the recess 43. The recess 43 has side surfaces, in the +Y direction, the −Y direction, and the +X direction, respectively formed by inner surfaces of the first side wall 421, the second side wall 422, and the third side wall 423. The side surface of the recess 43 in the −X direction is defined by a connection wall 48 (FIG. 8) connecting the end portion of the planer portion 47 in the −X direction and the end portion of the top wall 426 in the +X direction with each other, in a vertical direction. Thus, the recess 43 is defined by the planer portion 47, the first side wall 421, the second side wall 422, the third side wall 423, and the connection wall 48.

As illustrated in FIG. 7 and FIG. 8, a depressed portion 51 that is long in the Y direction and is wide in the X direction is formed in the −Z direction (toward the fuel cell stack casing 41) of the planer portion 47. A flow path forming cover 52 (FIG. 9) is attached to the depressed portion 51 from the −Z direction side.

Figure 9:
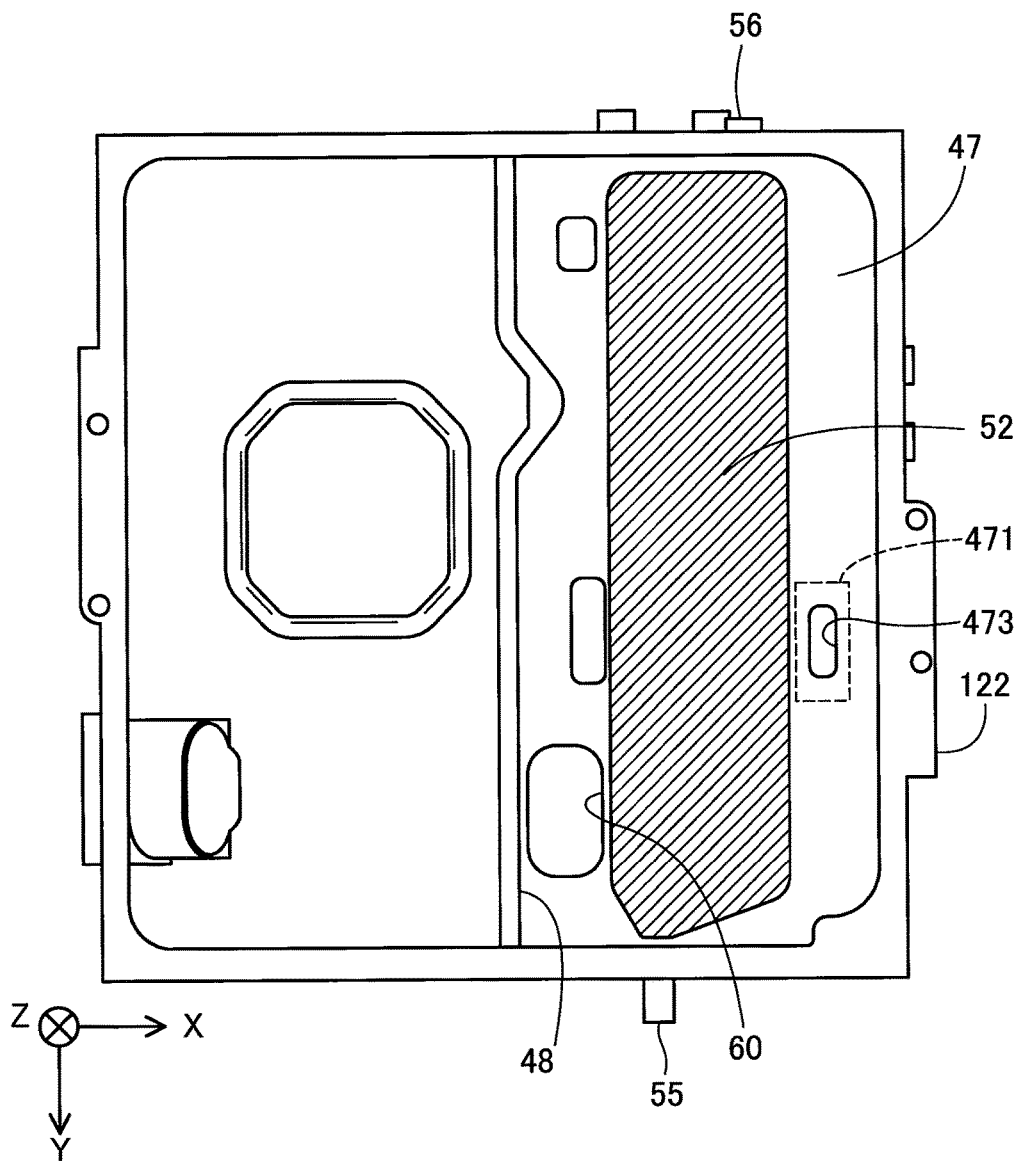
FIG. 9 is a diagram illustrating a state where a flow path forming cover is attached to a depressed portion.
Figure 10:
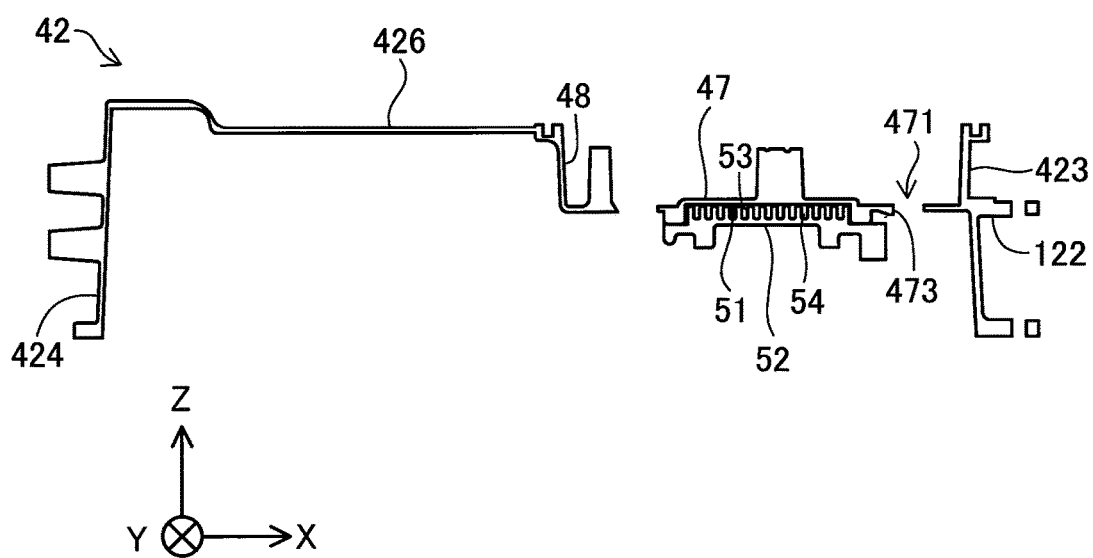
FIG. 10 is a cross-sectional view illustrating the state where the flow path forming cover is attached to the depressed portion.

FIG. 9 is a diagram illustrating a state where the flow path forming cover 52 is attached to the depressed portion 51. A hatched portion in FIG. 9 represents the flow path forming cover 52. FIG. 10 is a cross-sectional view illustrating the state where the flow path forming cover 52 is attached to the depressed portion 51. As illustrated in FIG. 10, a plurality of fins 53, extending in the Y direction, are arranged on the upper surface of the flow path forming cover 52, along the X direction. With the flow path forming cover 52 attached to the depressed portion 51, a coolant flow path 54 in which a coolant, for cooling the high voltage components, flows is formed on a bottom surface of the planer portion 47. The brittle portion 471 is arranged between the coolant flow path 54 and the pressure receiving portion 122, in the planer portion 47. The cooling medium flows in the Y direction between the fins 53, in the coolant flow path 54. The first side wall 421 and the second side wall 422 are provided with openings 55 and 56 through which the cooling medium flows into the coolant flow path 54. The coolant flow path 54 is not limited to this, and the fins 53 may be omitted for example.

Figure 11:
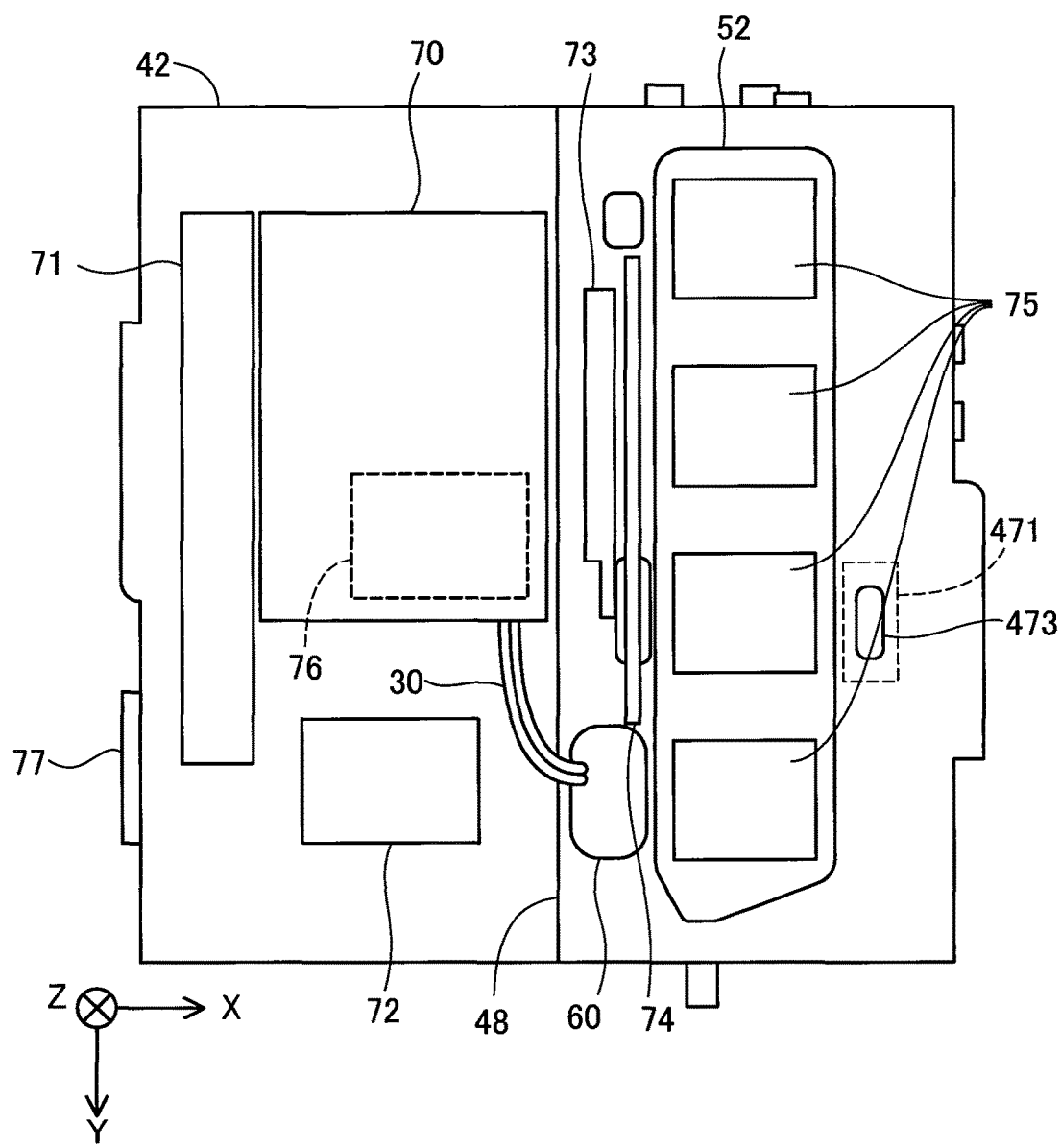
FIG. 11 is a schematic view illustrating how various electrical devices are arranged in the high voltage unit casing.
Figure 12:
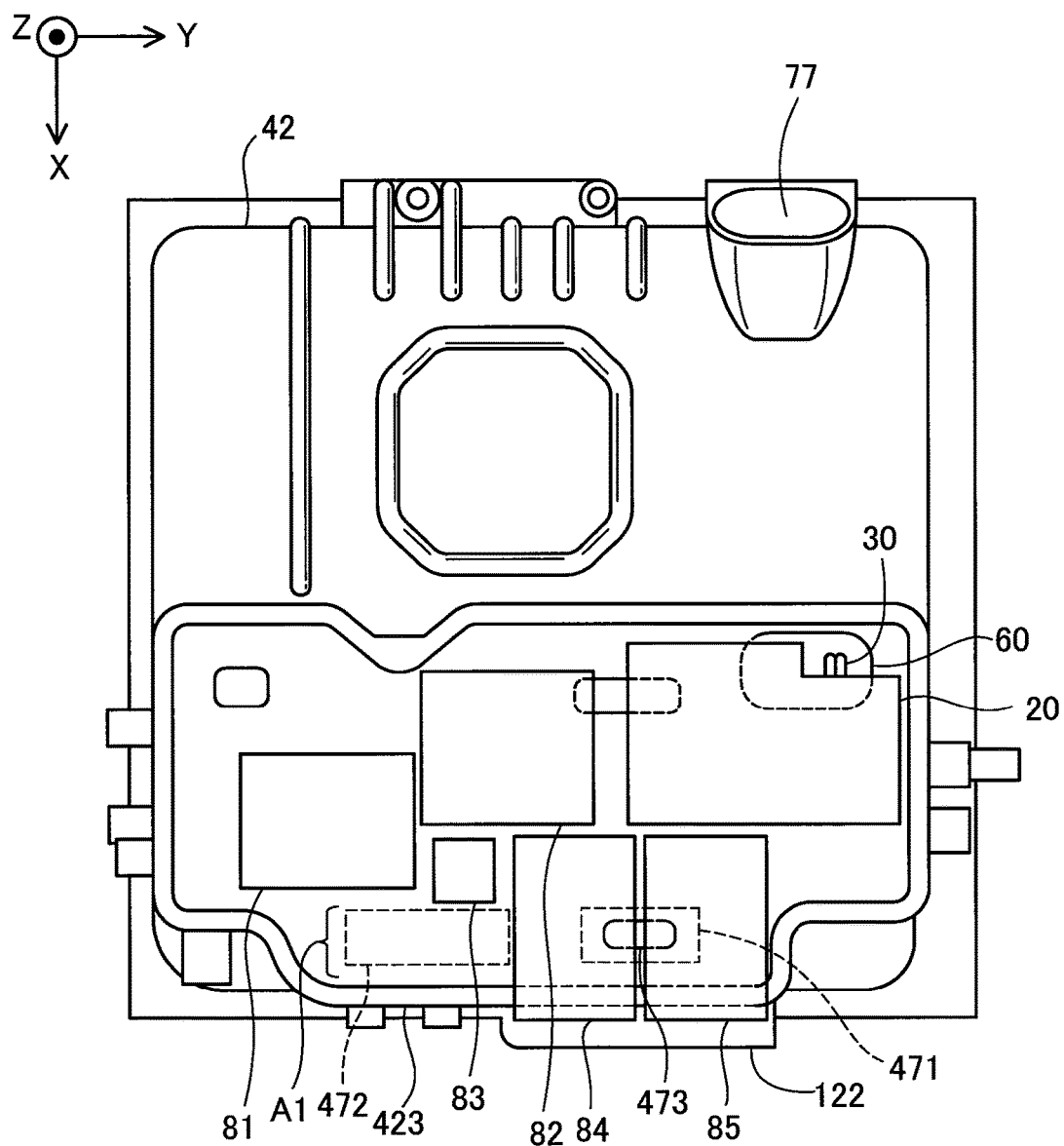
FIG. 12 is a schematic view illustrating how the various electrical devices are arranged in the high voltage unit casing.

FIG. 11 and FIG. 12 are schematic views illustrating how various electrical devices are arranged in the high voltage unit 420. FIG. 11 illustrates how the electrical devices are arranged on the lower surface side of the high voltage unit casing 42. FIG. 12 illustrates how the electrical devices are arranged on the upper surface side of the high voltage unit casing 42.

As illustrated in FIG. 11, high voltage components, including a power module 70, a cell monitor 71, a relay 72, a current sensor 73, a bus bar 74, and a plurality of reactors 75, are arranged and fixed on the lower surface side of the high voltage unit casing 42. The power module 70, the relay 72, and the cell monitor 71 are arranged and fixed on the lower surface of the top wall 426 of the high voltage unit casing 42. The harness 30 is connected to the power module 70, and passes through a communication hole 60, formed on the planer portion 47, to be connected to an externally power supplying unit 20 (FIG. 12) in the recess 43. The current sensor 73, the bus bar 74, and the plurality of reactors 75 are arranged and fixed on the lower surface of the planer portion 47 of the high voltage unit casing 42. In the present embodiment, the reactors 75 are fixed to the flow path forming cover 52 forming the coolant flow path 54. Thus, the reactors 75 are actively cooled with the coolant flow path 54.

The cell monitor 71 is a device for monitoring voltage generated by the fuel cells in the fuel cell stack 10. The bus bar 74 receives power generated by and input from the fuel cell stack 10. The power input from the fuel cell stack 10 is supplied to the reactors 75 via the bus bar 74. The current sensor 73 detects current output from the reactors 75. The reactors 75 are each connected to the power module 70 having integrated components including, a controller 76, a switching circuit, a capacitor, and the like. The power module 70 boosts the power output from the fuel cell stack 10. The power boosted by the power module 70 is supplied to a power control unit 130 (FIG. 13) via the relay 72 and a high voltage interface 77.

As illustrated in FIG. 12, high voltage components, including the externally power supplying unit 20 and two pump inverters 81 and 82, are disposed and fixed on the upper wall 425 of the high voltage unit casing 42, that is, on the upper surface of the planer portion 47. These high voltage components are arranged on the planer portion 47 with a gap from the right side wall 423 provided with the pressure receiving portion 122. An area of the planer portion 47 corresponding to the gap (hereinafter, referred to as a "gap area A1") has a portion, between the pressure receiving portion 122 and the high voltage components, provided with the brittle portion 471. A portion of the gap area A1 other than the brittle portion 471 is provided with the high strength portion 472 having higher strength than the brittle portion 471. In the present embodiment, the brittle portion 471 is provided with a through hole 473. The through hole 473 ensures lower strength of the brittle portion 471 than the high strength portion 472 in the horizontal direction. In FIG. 12, only a part of the entire range of the high strength portion 472 is illustrated. The high strength portion 472 may be entirely provided in the portion of the gap area A1 other than the brittle portion 471. The high strength portion 472 may be simply referred to as a "plate portion".

The externally power supplying unit 20, the two pump inverters 81 and 82, as well as an air conditioner connector 83, a battery connector 84, and a power control unit connector 85, are disposed on the upper surface of the planer portion 47. Among these components, the battery connector 84 and the power control unit connector 85 are fixed to the cover 44 (FIG. 1). The battery connector 84 supplies power, supplied from a secondary battery (not illustrated), to the externally power supplying unit 20 via the relay, and to an air conditioner via the air conditioner connector 83. The power, input from the secondary battery via the battery connector 84, is also supplied to the two pump inverters 81 and 82 and is further supplied to the power control unit 130 via the power control unit connector 85. The two pump inverters 81 and 82 convert DC power, supplied from the secondary battery, into AC power, and supplies the power, as a result of the conversion, to a hydrogen pump and a water pump (neither of which is illustrated). The externally power supplying unit 20 is connected to the controller 76, incorporated in the power module 70 (FIG. 11), via the harness 30 passing through the communication hole 60 formed on the planer portion 47. The controller 76 controls the externally power supplying unit 20 via the harness 30. The externally power supplying unit 20 is used for supplying power generated by the fuel cell stack 10 and stored in the secondary battery, to a load device outside the vehicle as appropriate.

In the present embodiment, the coolant flow path 54 is formed on the lower surface of the planer portion 47 as described above. Thus, the two pump inverters 81 and the externally power supplying unit 20 provided on the upper wall 425 of the planer portion 47 can be efficiently cooled together with the reactors 75 fixed to the lower surface of the planer portion 47.

Figure 13:
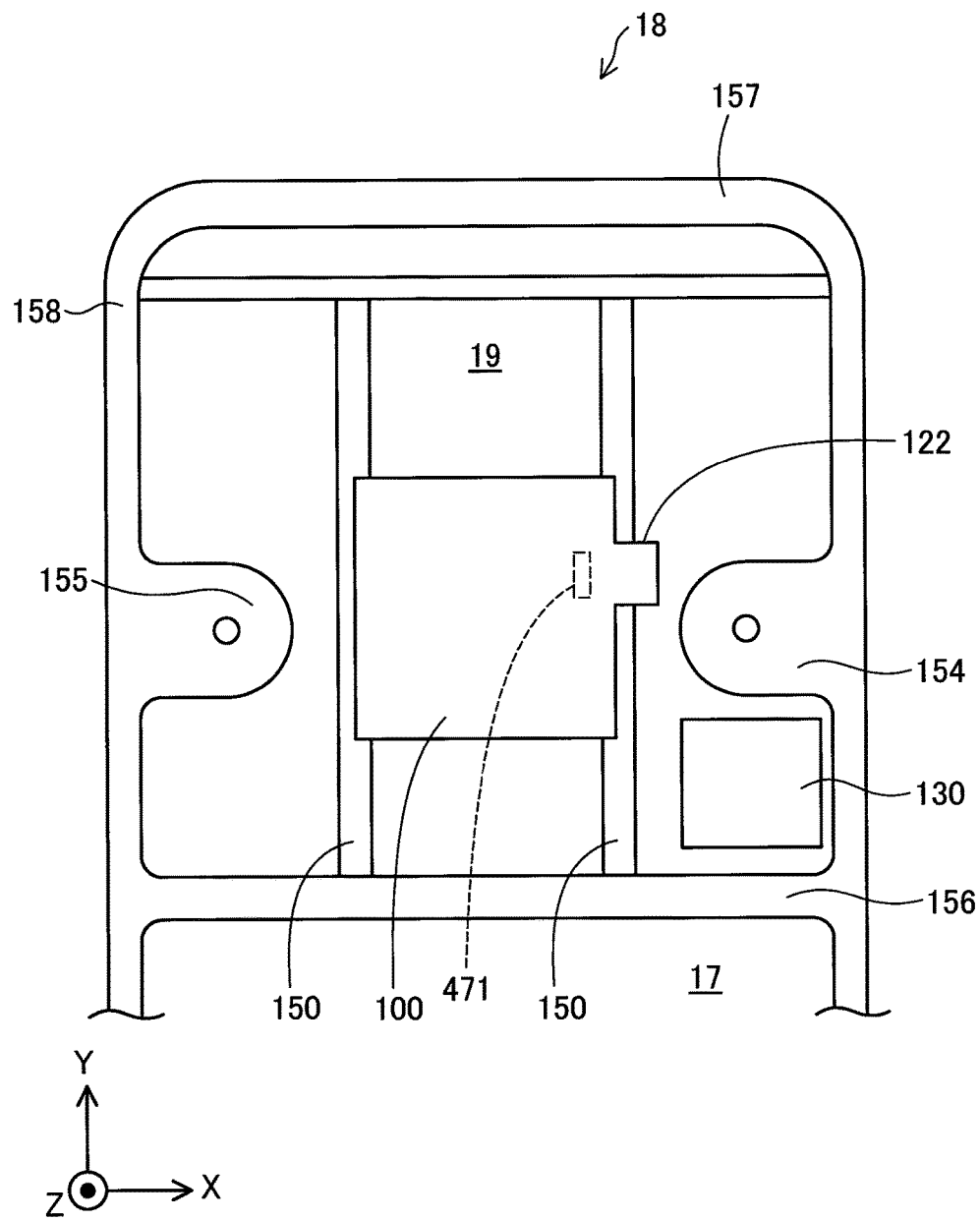
FIG. 13 is a diagram illustrating how the fuel cell unit installed in a vehicle is arranged.

FIG. 13 is a diagram illustrating how the fuel cell unit 100 installed in a vehicle 18 is arranged. In the embodiments described above, the fuel cell unit 100 is arranged inside a front compartment 19 of the vehicle 18. A bumper reinforcement 157, which is a part of a body 158, is provided in front of the front compartment 19. A dash panel 156 partitions the front compartment 19 and a cabin 17 behind the front compartment 19. The front compartment 19 includes a pair of suspension towers 154 and 155 protruding upward. The pair of suspension towers 154 and 155 are disposed on the lower side of the body, and are formed to cover front suspensions supporting front wheels of the vehicle 18 and support upper end portions of the front suspensions. The power control unit 130 is arranged between the rear side of the suspension tower 154 and the dash panel 156. The power control unit 130 is supported by the suspension tower 154, the dash panel 156, and the body 158. The power control unit 130 convers the power supplied from the fuel cell unit 100, controls charging/discharging of the secondary battery, drives an air compressor for supplying air to the fuel cell stack 10, and drives a traction motor for driving the wheels.

In the front compartment 19, the fuel cell unit 100 is fixed to a pair of suspension members 150, extending in a front and rear direction of the vehicle 18, via a mount or the like. The pressure receiving portion 122 provided to the high voltage unit casing 42 of the fuel cell unit 100 faces at least a part of the suspension tower 154, which is one of the suspension towers, in the X direction, that is, in the width direction of the vehicle 18. The pressure receiving portion 122 is positioned to be overlapped with the suspension tower 154 in a horizontal direction. In the present embodiment, the suspension tower 154 and the pressure receiving portion 122 of the high voltage unit casing 42, facing each other as described above, ensure higher resistance of the fuel cell unit 100 against impact received from the suspension tower 154 due to collision of the side surface of the vehicle 18 or the like.

In the embodiment described above, the high voltage unit 420 is provided with the planer portion 47 to have higher strength relative to the horizontal direction of the high voltage unit casing 42. With the right side wall 423 of the high voltage unit 420 provided with the pressure receiving portion 122, a portion receiving impact can be limited. The gap area A1, between the right side wall 423 provided with the pressure receiving portion 122 and the high voltage components, is provided with the brittle portion 471. Thus, impact in the horizontal direction received on the pressure receiving portion 122 can at least partially be absorbed by the brittle portion 471. Thus, the impact applied to the high voltage components in the high voltage unit casing 42 can be reduced.

In the present embodiment, the brittle portion 471 is formed with the through hole 473 formed in the planer portion 47. Thus, the brittle portion 471 can be formed with a simple configuration. With the through hole 473 formed, the amount of materials used for the high voltage unit casing 42 can be reduced, whereby the weight can be prevented from increasing and cost reduction can be achieved.

In the present embodiment, the planer portion 47 is positioned between the upper and the lower ends of the right side wall 423 in the vertical direction. This ensures high strength in the horizontal direction of the high voltage unit 420, compared with a case where the planer portion 47 is provided at the upper or the lower end of the right side wall 423.

In the present embodiment, the pressure receiving portion 122 is configured to receive the impact input in the width direction of the vehicle 18. This ensures higher resistance against impact from the side surface of the vehicle 18.

In the present embodiment, the planer portion 47 forms a wall surface of the coolant flow path 54 in which the coolant for cooling the high voltage components flows. Thus, the high voltage components can be efficiently cooled with the planer portion 47. In the present embodiment, the brittle portion 471 is arranged between the coolant flow path 54 and the pressure receiving portion 122. Thus, deformation of the coolant flow path 54 resulting in water leakage can be prevented, when the high voltage unit 420 receives impact via the pressure receiving portion 122.

B. Second Embodiment

Figure 14:
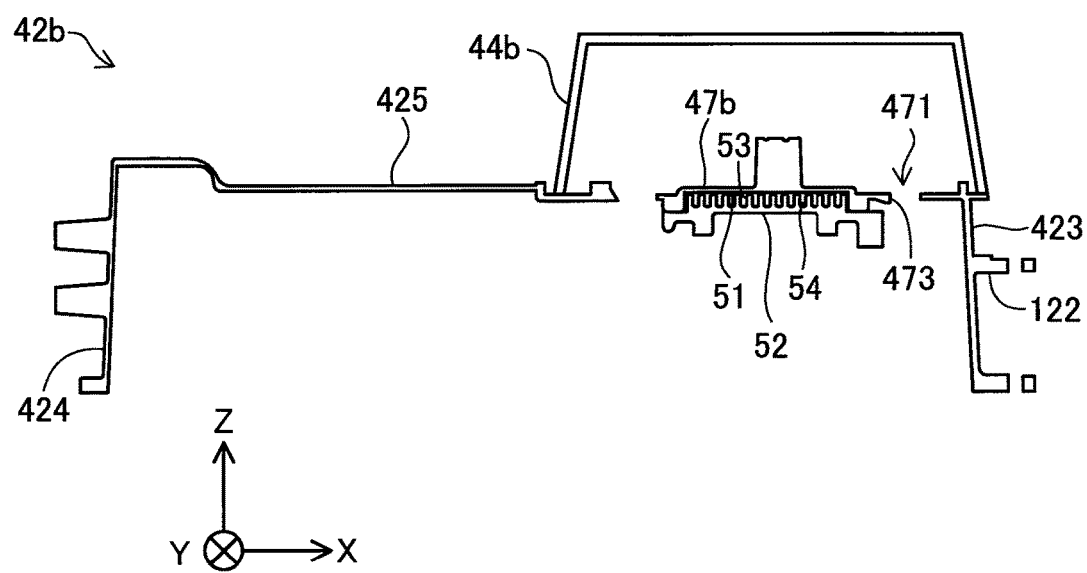
FIG. 14 is a cross-sectional view illustrating a configuration of a high voltage unit casing according to a second embodiment.

FIG. 14 is a cross-sectional view illustrating a configuration of a high voltage unit casing 42b according to a second embodiment. FIG. 14 is a diagram corresponding FIG. 10 in the first embodiment. In the figure, components that have the same functions as those described in the first embodiment are denoted with the same reference numerals. In the first embodiment, the planer portion 47 on which the high voltage components are arranged is positioned between the upper and the lower ends of the third side wall 423. In the second embodiment, a planer portion 47b on which the high voltage components are arranged is positioned at the upper end of the third side wall 423. Specifically, in the present embodiment, the planer portion 47b is formed as a part of the upper wall 425 of the high voltage unit casing 42b. A cover 44b that covers the high voltage components is attached over the planer portion 47b.

Also in the second embodiment, the brittle portion 471 is formed in the planer portion 47b as in the first embodiment. Thus, the impact input to the pressure receiving portion 122 can at least partially be absorbed by the brittle portion 471. Thus, the impact applied to the high voltage components in the high voltage unit casing 42b can be reduced. Although the planer portion 47b is positioned at the upper end of the third side wall 423 in the example described in the second embodiment, the planer portion 47 may also be positioned at the lower end of the third side wall 423.

C. Other Embodiments

In the embodiments described above, the brittle portion 471 is formed with the through hole 473 formed in the planer portion 47. However, the brittle portion 471 is not limited to this mode. For example, the brittle portion 471 may be formed by being thinner than the high strength portion 472. The brittle portion 471 may be made of a material with lower strength than the high strength portion 472. Furthermore, the brittle portion 471 may be formed by partially notching the planer portion 47.

In the embodiments described above, the planer portion 47 is provided with a single brittle portion 471. Alternatively, the planer portion 47 may be provided with two or more brittle portions 471.

The high voltage component or the electrical device in the high voltage unit casing 42 according to the embodiments described above may have any configuration. For example, the power control unit 130 illustrated in FIG. 13 may be partially or entirely arranged in the high voltage unit casing 42. Each of the high voltage components or the electrical devices in the high voltage unit casing 42 may be provided outside the fuel cell unit 100. The components arranged on the upper surface side and the lower surface side of the high voltage unit casing 42 may be at least partially exchanged.

In the embodiments described above, the coolant flow path 54 is provided on the lower surface of the planer portion 47. The coolant flow path 54 may be provided on the upper surface of the planer portion 47, or any surface of the connection wall 48. When the amount of heat produced by the high voltage components in the high voltage unit casing 42 is small, the coolant flow path 54 may be omitted.

In the embodiments described above, the fuel cell unit 100 is arranged inside the front compartment 19 of the vehicle 18. However, the position where the fuel cell unit 100 is arranged in the vehicle 18 is not limited to this. For example, the fuel cell unit 100 may be arranged below the floor of the cabin 17, in a part of a trunk, or below the floor of the trunk. In the embodiments described above, the fuel cell unit 100 is arranged in the vehicle 18 in such a manner that the pressure receiving portion 122 for the high voltage unit 420 faces the right side of the vehicle 18. Alternatively, the fuel cell unit 100 may be arranged in the vehicle 18 in such a manner that the pressure receiving portion 122 faces any other direction in the horizontal direction such as the forward side, the rear side, or the left side.

The stack unit 410 and the high voltage unit 420, which are integrated in the embodiments described above, may be separately arranged in the vehicle 18.

The disclosure is not limited to the embodiment and the modifications described above but may be implemented by a diversity of other configurations without departing from the scope of the disclosure. For example, the technical features of any of the above embodiments and modifications may be replaced or combined as appropriate, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the disclosure, there is provided a high voltage unit installed in a vehicle. This high voltage unit includes a high voltage component and a casing that accommodates the high voltage component. The casing includes a side wall provided with a pressure receiving portion that receives impact in a horizontal direction and a planer portion on which the high voltage component is arranged, the planer portion being adjacent to an inner side of the side wall. The high voltage component is arranged on the planer portion with a gap from the side wall provided with the pressure receiving portion. An area corresponding to the gap of the planer portion includes a portion, between the pressure receiving portion and the high voltage component, provided with a brittle portion, and includes a portion, other than the brittle portion, provided with a high strength portion having higher strength than the brittle portion. With this high voltage unit according to such an aspect, higher strength of the casing in the horizontal direction can be achieved with the planer portion. Furthermore, a portion receiving impact can be limited with the pressure receiving portion. The brittle portion is provided between the pressure receiving portion and the high voltage component, to at least partially absorb impact received by the pressure receiving portion. Thus, the impact applied to the high voltage component in the casing can be reduced.

(2) In the high voltage unit according to the above-described aspect, the brittle portion may be formed with a through hole formed in the planer portion. With this high voltage unit according to such an aspect, the brittle portion can be formed with a simple configuration.

(3) In the high voltage unit according to the above-described aspect, the planer portion may be positioned between upper and lower ends of the side wall. With this high voltage unit according to such an aspect, higher strength in a horizontal direction of the high voltage unit can be achieved.

(4) In the high voltage unit according to the above-described aspect, the pressure receiving portion receives impact input in a width direction of the vehicle. With this high voltage unit according to such an aspect, higher resistance against impact from a side surface of the vehicle can be achieved.

(5) In the high voltage unit according to the above-described aspect, the planer portion may form a wall surface of a coolant flow path in which a coolant for cooling the high voltage component flows. With this high voltage unit according to such an aspect, the high voltage component can be efficiently cooled with the planer portion.

The present disclosure can be implemented in various ways, and can be implemented in a fuel cell system, a vehicle, or the like including the high voltage unit described above.

What is claimed is:

1. A high voltage unit installed in a vehicle, comprising:
a high voltage component; and
a casing arranged inside a front compartment of the vehicle that accommodates the high voltage component, wherein
the casing includes a side wall provided with a pressure receiving portion that receives impact in a horizontal direction and a planer portion on which the high voltage component is arranged, the planer portion being adjacent to an inner side of the side wall,
the high voltage component is arranged on the planer portion with a gap from the side wall provided with the pressure receiving portion, and
an area corresponding to the gap of the planer portion includes a portion, between the pressure receiving portion and the high voltage component, provided with a brittle portion, and includes a portion, other than the brittle portion, provided with a high strength portion having higher strength than the brittle portion.

2. The high voltage unit according to claim 1, wherein the brittle portion is formed with a through hole formed in the planer portion.

3. The high voltage unit according to claim 1, wherein the planer portion is positioned between upper and lower ends of the side wall.

4. The high voltage unit according to claim 1, wherein the pressure receiving portion receives impact input in a width direction of the vehicle.

5. The high voltage unit according to claim 1, wherein the planer portion forms a wall surface of a coolant flow path in which a coolant for cooling the high voltage component flows.

6. The high voltage unit according to claim 2, wherein the through hole penetrates the planer portion in a vertical direction.

7. The high voltage unit according to claim 5, wherein the coolant flow path is arranged parallel to the planer portion.

* * * * *